United States Patent [19]
Garman

[11] Patent Number: 6,122,623
[45] Date of Patent: Sep. 19, 2000

[54] WATERSHED METHOD FOR CONTROLLING CASHFLOW MAPPING IN VALUE AT RISK DETERMINATION

[75] Inventor: Mark B. Garman, Orinda, Calif.

[73] Assignee: Financial Engineering Associates, Inc., Berkeley, Calif.

[21] Appl. No.: 09/109,110

[22] Filed: Jul. 2, 1998

[51] Int. Cl.$^7$ .................................................. G06F 17/60
[52] U.S. Cl. ................................ 705/36; 705/35; 705/37; 705/38
[58] Field of Search ................................. 705/35, 36, 37, 705/38

[56] References Cited

U.S. PATENT DOCUMENTS

| | | | |
|---|---|---|---|
| 5,101,353 | 3/1992 | Lupien et al. | 705/37 |
| 5,446,885 | 8/1995 | Moore et al. | 395/600 |
| 5,742,775 | 4/1998 | King | 705/37 |
| 5,761,442 | 6/1998 | Barr et al. | 705/35 |
| 5,812,988 | 9/1998 | Sandretto | 705/36 |
| 5,819,237 | 10/1998 | Garman | 705/36 |
| 5,884,287 | 3/1999 | Edesess | 705/36 |

FOREIGN PATENT DOCUMENTS

| | | | |
|---|---|---|---|
| 0 401 203 | 12/1990 | European Pat. Off. | G06F 15/24 |
| WO 96/30850 | 10/1996 | WIPO | G06F 17/60 |

OTHER PUBLICATIONS

Simon et al.; The risk–based to asset valuation, Corporate Finance Risk Management & Derivatives Yearbook 1996 Supplement PP: 15–17; Dialogue: File 15, Account #01315174, Apr. 1996.

Gordon; The best method for accurate risk management, Corporate Finance n144 PP: 32–34; Dialogue: File 15, Account 01350071, Nov. 1996.

Discounting in financial reporting: ASB working paper issued; Management Accounting–London v75n6 PP: 4; Dialogue: File 15, Account #01448210, Jun. 1997.

David; Company–at–risk; Euromoney n338 PP: 64–66; Dialogue: File 15, Account #01519687, Jun. 1997.

Sherree; Risk drive; Banking Technology, v14n10; Dialogue: File 268, Account #00328642, Jan. 1998.

John et al.; Risk, capital, and value measurement in financial institutions: Part II: The shareholder's perspective; Journal of lending & Credit Risk Management v81n3 PP: 64–69; Dilogue: File 15, Account #01728236, Nov. 1998.

Beckström, R. and Campbell, A., "An Introduction to VAR", C•ATS Software, Inc., 1995.

European Search Report for European Application No. 97 10 1727, May 30, 1997.

(List continued on next page.)

*Primary Examiner*—Eric W. Stamber
*Assistant Examiner*—Romain Jeanty
*Attorney, Agent, or Firm*—Fenwick & West LLP

[57] ABSTRACT

A system, computer implemented method, and software product provide for the correct allocation of cashflows to enable accurate determination of value at risk with respect to income and balance sheet risk for transactions portfolio including transactions occurring in different fiscal periods. The computer implemented method includes establishing watershed variables, such as watershed dates, and partitioning both cashflows derived from the transaction portfolio and the vertex set of market risk data into distinct subsets. The partitioned cashflows are allocated, using a regular allocation function, onto individual ones of the partitioned vertex sets. The partitioning and allocation correctly segregate cashflows with respect to the fiscal periods to which they contribute to the value at risk. The allocated cashflows are then each separately treated by a value at risk computation. A system includes a computer, database of transactions, networked or local access to market risk data, and a software product executing the computer implemented method. The software product may include a module for shredding transactions into cashflows, a module for partitioning the cashflows and vertex sets, a module for performing the regular allocation of partitioned cashflows, a module for performing the value at risk computations.

9 Claims, 3 Drawing Sheets

OTHER PUBLICATIONS

Jensen, D.L. and King, A.J., "Frontier: A Graphical Interface for Portfolio Optimization in a Piecewise Linear–Quadratic Risk Framework," IBM Systems Journal, vol. 31, No. 1, pp. 62–70, Jan. 1992.

Kalra, A., "Learning Curve, Measuring Value–at–Risk," Derivatives Week, Sep. 26, 1994.

Morgan, J.P., "Introduction to RiskMetrics™," Morgan Guaranty Trust Company, Market Risk Research, Oct. 6, 1994.

Morgan, J.P., "Latest Developments in RiskMetrics," Risk Magazine Annual Congress, Morgan Guaranty Trust Company, pp. 2–25 Jan. 25, 1996.

Morgan, J.P., "RiskMetrics™—Technical Document," Morgan Guaranty Trust Company, Global Research, Third Edition, pp. 1–211, May 26, 1995.

WATERSHED METHOD FOR CONTROLLING CASHFLOW MAPPING IN VALUE AT RISK DETERMINATION

FIELD OF INVENTION

The present invention relates generally to systems and method for risk analysis in securities portfolios, and more particularly, to systems and methods for allocating value at risk metrics with respect to discrete financial periods.

BACKGROUND

Analytic variance-covariance value-at-risk (VaR) is an established technique for measuring exposure to market-based financial risk. A recent and comprehensive overview of a specific VaR methodology is given in "RiskMetrics™— Technical Document," Fourth Edition, Dec. 18, 1996, by J. P. Morgan/Reuters. Given a description of the market characteristics and a statement of the user's transaction portfolio, the objective of VaR is to determine how much financial value might be lost over a given time period, with a given level of probability, in a given currency.

This analytic form of VaR begins by replacing a portfolio, or the trades within it, with a set of component asset flows (known generically as "cashflows") reflecting both those trades' current values and their risk attributes. This initial process is sometimes separately referred to as "shredding" the trades. The next step in determining VaR is cashflow allocation. Cashflow allocation distributes cashflows (which can be in any currency, commodity, or other price risk source) amongst a set of standardized maturities and credit levels at future specified time intervals, for the markets wherein the cashflows are traded, again preserving their value and risk characteristics. The future time intervals, such as 1 month, 3 months, 6 months, and 12 months, are generally a constant amount of time into the future, and hence are known as constant maturity tenors (or CMTs). The combination of a tenor and a cashflow type is termed a "vertex." For example, six-month Libor Deutschemark and two-year U.S. dollar swap market flows are possible vertices. The "edges" of a vertex are its different attributes, such as currency, amount, and tenor. The complete process of translating trades into vertex cashflows is generally termed "mapping." Mapping provides a representation of the original portfolio in the context of a standardized set of cashflows. The vertices onto which the cashflows are mapped are also used as the index set of a covariance matrix of the market values of the cashflows, which describes the current market risk characteristics to a reasonable degree of detail. Having thus arrived at the "cashflow map" (i.e., the net result of mapping a portfolio of trades onto the benchmark cashflows), the cashflow map is then combined with the covariance matrix, along with a time horizon and a probability confidence level, yielding the desired result, namely, the value-at-risk (VaR) number. The VaR value indicates the dollar (or other currency) amount that could be lost, within the time period of the cashflows, with a given level of confidence.

The current state of cashflow allocation art is given rather extensive definition in "RiskMetrics™—Technical Document," cited above, at pp. 117–121. One of the key issues in cashflow allocation is allocation of a cashflow that has a timing (date of execution) that lies between the timing of the two "closest" vertices. RiskMetrics teaches an allocation that splits such a cashflow between those two nearby vertices. This allocation may involve preserving net present value, VaR, duration, or some other criteria or combinations of these and/or other such criteria. This allocation method (to two vertices) is herein termed a "regular allocation." Implicitly also, if the original cashflow's timing does not lie between two vertices, all of it is simply allocated to the most nearby vertex. For example, a cashflow due to occur in one week would all be allocated to the 1 month vertex in RiskMetrics, since this is the earliest vertex for data which is provided in the commercially available covariance matrices. Likewise, a 32-year cashflow would be allocated entirely to the 30-year vertex, since this is the longest time vertex now used.

The regular cashflow allocation methodology may be diagrammatically illustrated as in FIG. 1. In this figure, there are five cashflows that are each to be allocated over vertices involving only three edge values, indicated as vertices 1, 2, and 3, each having a constant maturity time relative to an analysis date, such as 1 month, 3 months, and 6 months. It should be noted that the vertices here may be sets of vertices.

The first cashflow (#1) has a tenor earlier than any vertex. The regular allocation method assigns 100% of this cashflow (possibly adjusted for the present value of money) to this vertex #1, generally following the RiskMetrics methodology. The cashflows #2, #3, and #4 each lie between a pair of vertices. Therefore, the regular allocation divides each of these cashflows between the two most nearby vertices. Thus, cashflow #2 is allocated between vertex 1 and vertex 2; cashflows #3 and #4 are both allocated between vertices 2 and 3. The last cashflow #5 has a tenor longer than any vertex, so it is entirely allocated to the last vertex 3.

However, some institutions employing analytic and other forms of VaR analysis are interested in separating the risks of their income statement for the next period from the risks of their balance sheet at the end of that period. That is, there is a desire to obtain a number of VaR results from a single portfolio, with each VaR limited to a specific time period. For example, on January 1, a company may have a financial quarter ending on the next March 31, and its corporate treasury officers may have an interest in keeping the VaR calculated for a trading portfolio from the period from the January 1, until March 31 separate from the VaR calculated for that same portfolio after that date. However, present techniques in analytic VaR do not permit such separation because their prescribed means of cashflow mapping do not recognize such separations of time periods. Instead, the cashflows of portfolio are simply allocated onto the various tenors, irrespective of the specific dates of interest, such as an end of financial quarter.

As a concrete example, suppose that a fixed-price contract (a contract to buy or sell periodically in the future) is entered into by a corporate entity. To be more specific, suppose that the corporate entity is a jewelry manufacturer and that it has contracted to purchase 100 oz. of gold every month for the next two years, from a supplier at the fixed price of US$400 per oz. (regardless of the market price). Using conventional VaR methodology, this contract would be decomposed into "cashflows" involving inflows of 100 oz. of gold each month and outflows of $40,000 every month; this is the "shredding" of the contract into component cashflows. Next, a regular allocation would allocate each component cashflow to various vertices. For example, the U.S. dollar and gold vertices are typically defined for maturities at 1 month, 3 months, 6 months, 12 months, and 24 months from the date of analysis. Under a regular allocation, every gold and U.S. dollar cashflow that occurs between two vertices (relative to the date of analysis) will always be partially allocated between these two vertices. For example, the gold cashflow occurring at 5 months from the analysis date will be divided between the 3 months and 6 months' vertices, with more of the cashflow being allocated to the 6 month vertex. In a similar fashion, the remaining gold and U.S. dollar cashflows in this example will be allocated to their surrounding vertex maturities.

Now suppose further that all cashflows occur on the $20^{th}$ of each month, that the contract runs from January of this year through December of the following year, that the analysis is being performed on February 10 of this year, and that the corporation's fiscal year ends on September 30 of this year. In a regular allocation, the cashflow occurring September 20 (7 months and 10 days from the analysis date) will be allocated between the 6 month and 12 month vertices, which correspond, on the analysis date to August 20, and February 10 of the next year, respectively. However, if the corporation's fiscal year ends on September 30 of the current year, it is desirable for the corporation to separate its calculation of VaR before its end-of-fiscal-year ("income statement risk") from that after end-of-fiscal-year ("balance sheet risk"). Conventional VaR technology does not provide the means of such separation of VaR into these different types of risks.

The analysis is complicated by the fact that vertices are, as noted above, defined by constant maturity tenors. This means that the time periods involved in vertex definition are a constant period of time ahead from the current point of analysis, for example, always three months or six months from the date the VaR analysis is performed. Correspondingly, this implies that the dates associated with the vertices shift forward one day as each day passes. On the other hand, most financial instruments lead to cashflows that occur on fixed dates, dates which do not shift forward as do the CMTs. This temporal mis-match between vertices and cashflows causes constantly shifting cashflow maps, as the time at which the VaR analysis is conducted constantly changes. That is, the VaR result produced on today for a given portfolio will be different from the VaR result produced tomorrow. Moreover, the future dates in which corporations are interested, for example the fiscal year ends for separation of income statement verses balance sheet risk, tend to be of the fixed-date variety. Thus, present methods do not enable the accurate analysis of income and balance sheet risk.

Various solutions have been proposed and considered to the problem of properly allocating cashflows for performing the VaR analysis. One approach is that of the accountants, namely to separate the financial portfolio by types of financial instruments, specifically income-statement verses balance-sheet instruments, and then separately shred, allocate and compute the VaR for each subset. This is most commonly done according to the maturity of the instrument. For risk analysis purposes, however, this is not an effective technique. The approach fails because instruments that mature after the end of the fiscal year can nonetheless generate cashflows before the end of the fiscal year, such as in the jewelry company example above. Occasionally, but more rarely, the opposite is also true.

Separation of cashflows by time period is another possible method. All cashflows before the end of the fiscal year are allocated by themselves, and all cashflows after the end of the fiscal year are separately allocated, and a VaR computation is performed for each set. But this approach also fails, because the prescribed mapping methodologies allow amounts to be allocated to vertices on both sides of the fiscal year. In the jewelry company example above, on March 30, a cashflow on September 20 occurring before the end of the fiscal year on September 30 might be partially allocated to a vertex at December 31, well after the end of the fiscal year. Thus segregating cashflow portfolios fails also.

Another solution is to define new, "synthetic" vertices just prior to and after the fiscal year end date. For instance, if the fiscal year ended September 30, one synthetic vertex is created at September 30 and another is created at October 1. While this approach may prevent the allocation of cashflows across the fiscal year barrier, as in the previous approach, there are still serious shortcomings to this method. First, the synthetic vertices, unlike the other vertices, are not CMTs, and so the correlation estimates (which are necessary for the VaR calculation) between these and the other vertices will be constantly changing as time passes, even if the markets are completely quiescent. Second, the high correlation between the two synthetic vertices may itself cause instability in the allocation calculations. Third, there may still occasionally be some evaluation dates where cashflows fall between the synthetic vertices, and the regulation allocation between these vertices may still be erroneous (without error bound, since the cashflows are of unbounded size).

Accordingly, it is desirable to provide a computer system and computer implemented method that provides for the analytically correct allocation of cashflows into any arbitrary number of distinct time periods, and thereby allows for the correct determination of VaR for each such time period. It is further desirable to provide a system and method for correctly determining income sheet and balance sheet risk for any portfolio of transactions.

SUMMARY OF THE INVENTION

The present invention overcomes the limitations of existing technology and permits the proper separation of transactions into distinct time periods, and the subsequent computation of VaR. The present invention employs "watershed" variables, which can be defined, inter alia, to represent dates around which the shredded cashflows of a portfolio are allocated. Once so allocated, the correct VaR for each allocated set of cashflows is determined.

In one embodiment that correctly allocates transactions for determining income sheet and balance sheet risk, a watershed variable is defined for the fiscal year end date. Although watershed dates are initially fixed dates, they are momentarily converted to terms comparable to the vertex terms, for the purposes of the immediate analysis, and thus do not induce the problem noted above by the synthetic vertices. For example, converting a specific watershed date transforms it to a number of days from the current date. Once converted to comparable terms, the underlying covariance matrix of market risk data is partitioned into two subsets by the watershed date, with one subset of vertices occurring before the watershed date, and the other subset of vertices occurring after the watershed date. The shredded cashflows can then be mapped onto the subsets of vertices, and individual VaR results can be computed for each subset of cashflows. The VaR results for each subset are guaranteed to be analytically correct.

An example of the method of the present invention is as follows. Taking the jewelry company example above, and using the February 10 as the analysis date, then the 6 month vertex occurs on August 10 of the current year, and the 12 month vertex occurs on February 10 of the next year. The comparable-terms watershed variable (here watershed date) might then be given as September 30, representing the end of the fiscal year.

The following rules are then used to allocate the shredded cashflows. First, all cashflows is at dates earlier than the watershed date, but later than the date of the last vertex before the watershed date, are allocated entirely to that last vertex. Second, all cashflows at dates later than the watershed date, but earlier than the date of the next vertex after the watershed date, are allocated entirely to that next vertex.

In this example, these allocation rules mean that the specific cashflows occurring at August 20 and September 20 are entirely allocated to the August 10 vertex (the 6 month vertex) which is the last vertex prior to the watershed date, since they are later than August 10 but earlier than September 30 watershed date. The cashflows occurring at October 20, November 20, December 20, and January 20 are all allocated solely to the 12 month vertex of February 10, which is the next vertex after the watershed date. In effect, cashflow allocations are prohibited from being made "across the watershed." Now for each of these allocated sets of cashflows, the VaR computation is performed, producing a separate income sheet VaR for cashflows before fiscal year end, a balance sheet VaR for cashflows after fiscal year end. As time passes from original analysis date, the watershed variables (unlike the synthetic vertices) will move relative to the CMT vertices, and so the vertices affected by the watershed prohibitions also change, thereby preserving the risk characteristics of the covariance matrix used to compute the VaR. Thus, subsequently computed VaR results will still accurately describe the income and balance sheet risks.

The method of the present invention may be explained by illustration, as shown in FIG. 2. In this example, only a single watershed variable, a watershed date, is defined as lying between vertex 2 and vertex 3, to represent a date of interest, such as fiscal year end. For purposes of the illustration, it is assumed that the portfolio to be analyzed has been reduced to a set P of component cashflows. It is further assumed that the watershed date W (relative to the date of analysis) occurs after cashflow #3, but before cashflow #4. Accordingly, the watershed date is converted to a constant maturity tenor that is longer than the tenor for cashflow #3 and shorter than the tenor of cashflow #4.

As a first step, the dates of the vertices of the underlying covariance matrix M are partitioned into two subsets, $M_1 = \{Vertex\ 1, Vertex\ 2\}$ and $M_2 = \{Vertex\ 3\}$. The cashflows are then partitioned into two corresponding sets, based on their dates. These are $P_1 = \{Cashflow\ \#1, Cashflow\ \#2, Cashflow\ \#3\}$ and $P_2 = \{Cashflow\ \#4, Cashflow\ \#5\}$.

The watershed allocation method then allocates of the cashflow sets P onto the partitioned vertex sets M. The cashflow allocation is illustrated in FIG. 2 as follows. Cashflows #1 and #2 from $P_1$ are allocated in basically the same fashion as in FIG. 1. Cashflows #3 and #4 are allocated differently. With respect to cashflow #3, because this cashflow has a tenor greater than vertex 2, some portion of it must be allocated there; but because it also had tenor less than the watershed date, none is allocated "across the watershed" to vertex 3. Consequently, all of cashflow 3 is allocated to vertex 2. In effect, cashflows #1, #2, #3, and any other cashflow having tenor less than W, are subject to a regular allocation as if all vertices after W were not present, i.e., as if the set of vertices $M_1$ were the only vertices to be considered. This step contrasts with the regular allocation of FIG. 1 in which cashflow #3 was allocated between vertices 2 and 3. Likewise, cashflow #4, which has a tenor longer than the tenor of the watershed date, is allocated entirely to vertex 3, which is the only vertex in set $M_2$. This contrasts with the regulation allocation method that also allocated cashflow #4 between vertices 2 and 3. Finally, cashflow #5 is allocated to vertex 3, as in FIG. 1.

While particularly suited for partitioning cashflows by watershed dates for determining income and balance sheet risk, the present invention allows for watershed variables to be defined with respect to various other characteristics of the vertices, such as currency type, credit worthiness, and the like. This enables differential VaR analysis of a trading portfolio with respect to any of its formal characteristics.

In one embodiment, the present invention provides a computer executable software product, for use with a conventional computer system, that embodies the method of the present invention. More particularly, the computer executable software product executes a method that correctly allocates transactions into sets with respect to some independently defined watershed variable, such as date, amount, currency type, instrument, or the like, and determines a value-at-risk measure for each set of transactions. The method includes converting the stored transactions into a set of cashflows. This may be done using any useful shredding technique. A set of vertices is stored, with each vertex including an edge value for each of a plurality of edges, where each edge has a unit type, and where selected ones of the vertices form a canonical vertex set. The method receives a set of N watershed variable values for at least one of the edges. This defines the watershed value with respect to which the transactions will be allocated and the value at risk determined, For example, for watershed dates, any number of dates may be used. The watershed variables are then converted to a same unit type as the corresponding edge.

The method next includes partitioning the values of the edge into N+1 partitioned edge value sets according to the N watershed variable values. For example, if there are 2 watershed dates, then there are 3 sets of partitioned sets. The vertices of the canonical set are then partitioned using the N+1 partitioned edge value sets, thereby producing N+1 partitioned vertex sets, each of which includes at least one vertex.

Now the set of cashflows is partitioned using the N+1 partitioned edge value sets, to produce N+1 partitioned cashflow sets, each of which including at least one cashflow. Having partitioned the cashflows into various sets, they may now be allocated. This is done as follows:

For each partitioned cashflow set, the cashflows within the set are allocated onto only the vertices in a corresponding partitioned vertex set. Thus, the cashflows in a first cashflow set are allocated onto vertices in the first vertex set, and so forth.

Finally, for each of the partitioned vertex sets, the value-at-risk is determined for the cashflows allocated onto the vertices in the partitioned vertex set. This produces a value-at-risk measure which is analytically correct for each cashflow set.

BRIEF DESCRIPTIONS OF THE DRAWINGS

DETAILED DESCRIPTION OF THE PREFERRED EMBODIMENTS

Figure 1:
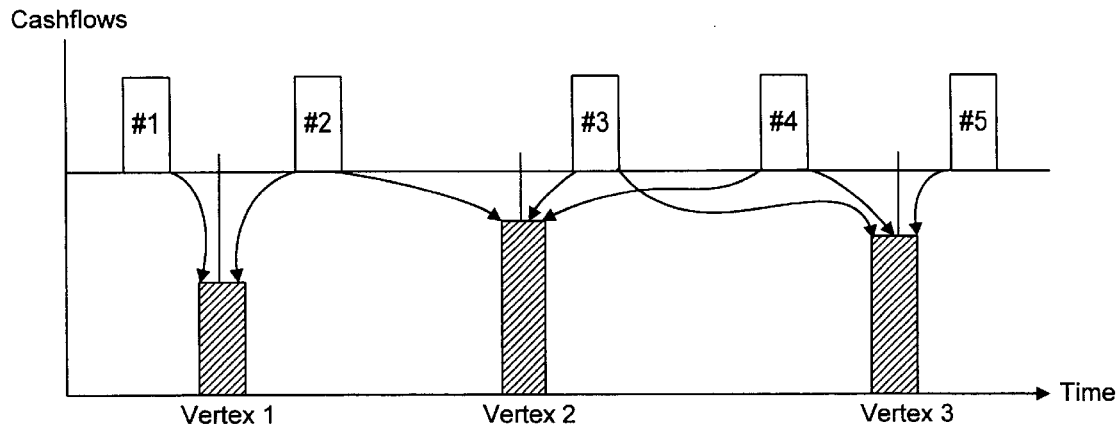
FIG. 1 illustrates the conventional regulation allocation methodology.
Figure 2:
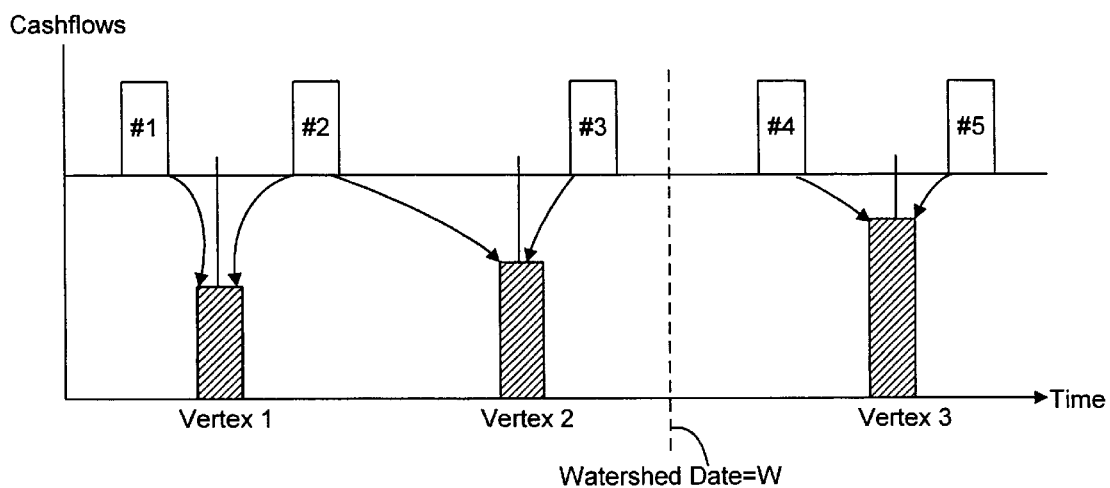
FIG. 2 illustrates the watershed allocation methodology of the present invention.
Figure 3:
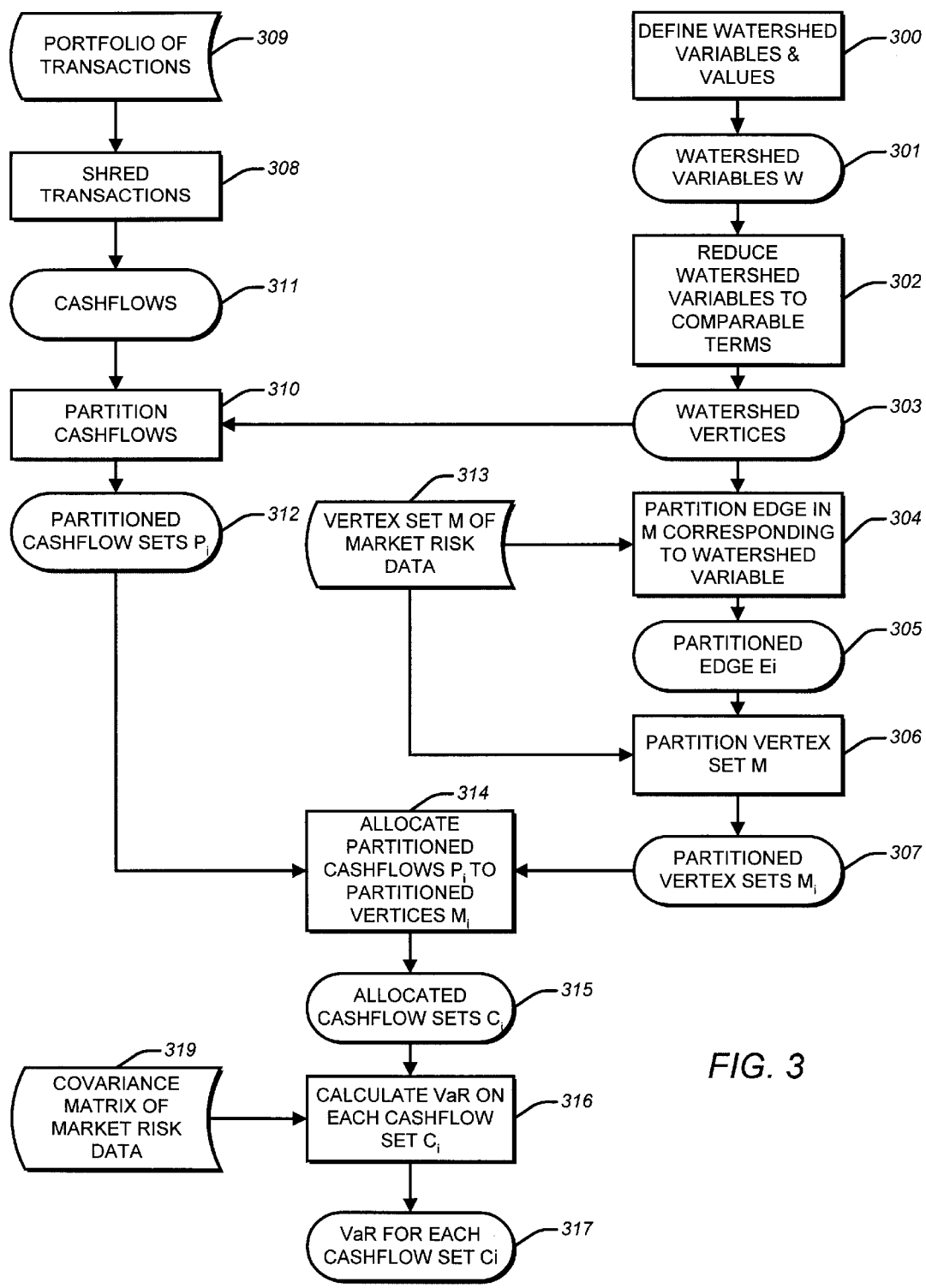
FIG. 3 is a flowgraph of the allocation methodology of the present invention.

Referring to FIG. 3 there is shown a flowgraph of one embodiment of a computer implemented method in accordance with the present invention. The method is implemented by a software product containing executable instructions which is executed by a conventional processor, using stored and user supplied data. First, a formal terminology for describing FIG. 3 is provided.

Vertices, as defined in the RiskMetrics methodology, are the most fundamental element for market description purposes and consist of multiple descriptive dimensions. Their significance is that each vertex may be associated with such descriptive market information as price, volatility, and correlations. For example, a typical vertex in the RiskMetrics methodology might be denoted as DEM.S03, which means Deutschemark (DEM) traded in the three year swaps market (S03). In this notation, the first dimension is the currency, which here has the value DEM, but might also have been USD (U.S. dollar), GBP (Pound Sterling), or some other currency designator. The second dimension is termed in RiskMetrics a "series," which is a combination of market (here for the swaps market, "S") and a maturity ("03," for three years).

For purposes of explaining the present invention, the dimensions of a vertex are called "edges" and their values are termed "edge values." (These terms are not currently part of the RiskMetrics terminology.) Thus, the currency name is the first edge, and "DEM" is one of its possible edge values. Note then that an alternative to the RiskMetrics two-edge vertex approach would have been a three-edge system, where the example vertex might have been denoted "DEM.S.03," the dots being used to separate the edges within the notation. In principle, vertex has an edge for each of its market characteristics, and an edge value associated with each edge.

More formally, an edge is a named set of edge values and the set of all possible vertices is the Cartesian product of all edges. For example, suppose that C={USD, DEM, GBP} is a "currency" edge, T={3MO, 6MO, 12MO} is a "tenor" (time to maturity) edge, and that there is also a "credit" edge X={AAA, A, BB}. Then the set of possible vertices would be M=C×T×X={(USD, 3MO, AAA), (USD, 3MO, A), . . . }. That is, all triples where an edge value is chosen from one of the edge sets.

A cashflow is next defined as a signed amount associated with a vertex element. For example, (+100, USD, 3MO, A) is a cashflow of 100 U.S. dollars to be received in three months from an "A" credit counterparty. Note that a cashflow may be initially expressed as having a fixed date of execution, and then converted as a relative tenor (e.g., 3 months) given a date of analysis.

In some embodiments it is desirable, for data reduction purposes, to select a subset from each edge set to represent the market characteristics of the original edges. That is, $\hat{C} \subset C$, $\hat{T} \subset T$, and $\hat{X} \subset X$ are edge subsets (termed canonical edges), and a canonical vertex set is $\hat{M} \subset \hat{C} \times \hat{T} \times \hat{X}$, which is clearly a subset of the original set of vertices M.

Generally, an edge will be said to be ordinal if its values can be ordered, i.e. there is a comparison operator ">" such that for any two distinct edge values i and j selected, either i>j or j>i, and for any three edge values i, j, and k, i>j and j>k implies i>k. (Again, RiskMetrics contains no such concept, and does not consider ordering of the values of a dimension.) If an edge is ordinal, its corresponding canonical edge is also ordinal.

For example, tenor edges are always ordinal, since every tenor can be considered as earlier or later in time. Credit edges are typically ordered, from highest credit to lowest (or vice versa), sometimes via a credit scoring scheme or ratings. Currency edges are typically not ordinal in practice, but may be ordered by geographical or other proximity measures if desirable in a particular risk analysis that sought to allocate risk by currency type, geography, or the like.

Referring now to FIG. 3, N ordered, watershed variables W={$w_1 < w_2 < w_3 < \ldots w_N$} (301) are defined 300 as new, externally introduced edge values for a given ordinal edge. The types and numbers of different watershed variables are not limited by the present invention. Watershed variables may be dates, credit types, currencies, or any other useful metric for measuring risk.

In the preferred embodiment the tenor edge is selected as the ordinal edge, per the examples. The watershed variables W are selected to represent the end of the corporate fiscal year, fiscal quarters, or similarly significant institutional dates. For the important case in the preferred embodiment of determining income and balance sheet risks, there will be a single watershed variable W representing the end of a fiscal year.

The watershed variable(s) is reduced 302 to the same terms as the edge values. Where the watershed variables are watershed dates, these would be normally input by the user as fixed dates, such as a fiscal year end of September 30. A watershed date is then converted to a CMT value, typically based on number of days between the date of analysis and the watershed date. For example, if the tenors being used are expressed as 30, 60, 90, 120, 150, 180, . . . 360 days, and the analysis date is March 30, and the watershed date is July 31, then reduction of the watershed date converts to a tenor of 123 days. Reduction 302 of the watershed variables into comparable terms creates a set of watershed vertices 303.

The watershed allocation method works with a variance-covariance matrix Q of market risk data, such as a RiskMetrics data set, and corresponding set of vertices M, such as described above. The introduction of the watershed variables W is then used to partition 304 the edge values of a corresponding ordinal edge E of the vertex set M into N+1 sets: $E_1$ having edge values not greater than $w_1$; $E_i$ having edge values greater than $w_i$ but not greater than $w_{i+1}$, termed $E_i$, i=2, . . . , N; and $E_{N+1}$ with edge values greater than $w_N$. Continuing the above example, edge E is the tenor edge of vertex set M with values E={30, 60, 90, 120, 150, 180, . . . , 360}, and the watershed vertex is 123. Accordingly, $E_1$={30, 60, 90, 120} and $E_2$={150, 180, . . . , 360}. If more than one watershed date were defined after July 31, then there would be further subsets of E.

The partitioning of edge values E is then used to partition 306 the vertex set M, namely M∩( . . . ×$E_1$× . . . ), which is denoted $M_i$, i=1, 2, . . . , N+1. Continuing the above example, $M_1$ would include all triples of credit X and currency C where the tenor T is one of {30, 60, 90, 120}, and $M_2$ would contain all triples where the tenor T is one of {150, 180, . . . , 360}. This step of the method is termed vertex partitioning. The result is the partitioned vertex sets $M_i$ (305).

Separately (either before or after) the portfolio of transactions 309 to be analyzed is shredded 308 into a set 307 of component cashflows P. In a typical embodiment, a portfolio may have 200,000 or more trades, which when shredded, produce 1,000,000 or more cashflows. Accordingly, it is desirable, for cashflow mapping purposes, to sort the cashflow set P with respect to the ordinal edge being used by the watershed variables. For watershed dates, the cashflows are ordered by their execution dates.

The set of shredded cashflows P are partitioned 310 by the edge value partitions $E_i$, namely P∩( . . . ×$E_i$× . . . ), to produce a collection of partitioned cashflow sets denoted $P_i$ (312). In a preferred embodiment with a single watershed date, the cashflows P are grouped into sets $P_1$ having an execution date prior to the watershed date, and $P_2$ having an execution date after the watershed date. More particularly, in this embodiment, the ordered cashflows in P are iteratively compared with the watershed date, beginning with an earliest cashflow and earliest watershed date. When a cashflow P[n] is identified having a date after the earliest cashflow date, then the index (n−1) is stored indicating that cashflow set $P_1$ contains cashflows P[0] to P[n−1], and thus $P_2$ contains the remaining cashflows. If there is more than one watershed date (or other watershed variables) further iterative indexing of P can be done.

For example, assume that P is the set of cashflows:
{(+100, USD, 29), (+100, USD, 66), (+100, USD, 96), (+100, USD, 125), (+100, USD, 156), (+100, USD, 185), (+600, USD, 215), (+600, USD, 245), (+600, USD, 275), (+600, USD, 304),(+600, USD, 335)}
where a cashflow is (amount, current, days until execution).

Further assume that a watershed date is selected 300 by the user, and reduced 302 to a comparable tenor of 166 days. Then $P_1$={(+100, USD, 29), (+100, USD, 66), (+100, USD, 96), (+100, USD, 125), (+100, USD, 156)}, and $P_2$={(+100, USD, 185), (+600, USD, 215), (+600, USD, 245), (+600, USD, 275), (+600, USD, 304),(+600, USD, 335)}.

For each partitioned cashflow set $P_i$, a regular allocation 314 of the cashflow set $P_i$ is made only onto the corresponding set of vertices $M_i$, for each pair of induced partitions i=1, 2, . . . , N+1. That is, whenever a cashflow in $P_i$ has a timing that would place it "inside" a certain set within the watershed partitioning of edge values $E_i$, it is mapped only into the corresponding set of vertices $M_i$, and all other vertices in M are ignored completely. Thus, the cashflow mapping of each cashflow set $P_i$ is conducted as if the other vertices never existed, using any desired mapping methodology to perform 314 the allocation, but now only onto the reduced set of vertices $M_i$, not the full set M. This second portion of the watershed method is termed cashflow partitioning. The result of cashflow partitioning is a collection of sets 315 of allocated cashflows $C_i$.

Continuing the above example, partitioned cashflow sets $P_1$ and $P_2$ are mapped onto partitioned vertex sets $M_1$ and $M_2$, produce allocated cashflows sets $C_1$ and $C_2$ as follows:

EXAMPLE

Mapping $P_1$ onto $M_1$:
(+100, USD, 29)→M1[1]
(+100, USD, 66)→(M1[1] & M1[2]) . . .
(+100, USD, 156)→M1 [last]

Mapping $P_2$ onto $M_2$:
(+100, USD, 185)→(M2[2] & M2[3])
(+600, USD, 215)→(M2[3] & M2[4]) . . .
(+600, USD, 335)→(M2[last−1] & M2[last])

where → represents the regular allocation function, and M1[1]=30, M1[2]=60, . . . M1[last]=120, and so forth, and M2[2]=180, and M2[3]=210, and M2[last]=360, and so forth cashflow in $P_1$ is allocated entirely to the last vertex in $M_1$, and not at all allocated to the first vertex in $M_2$. Note further that the last cashflow in $P_2$ is mapped onto the last and next to last vertex in $M_2$, since its date (335 days when expressed as a CMT) is between the two vertices of 330 and 360 days.

Finally, the VaR calculation is conducted 316 in a partitioned fashion. Suppose m (P, M) is the regular allocation function (at 314) which yields the allocated cashflow amounts $C_i$ mapped onto each vertex in the vertex set $M_i$ of the partitioned cashflow set $P_i$. Then a VaR is calculated 316 separately for each corresponding induced partition pair, namely:

$VaR_i \equiv VaR(m(P_i, M_i))$.

This last portion of the watershed method is referred to as VaR partitioning.

In a preferred embodiment for determining income and balance sheet risk given a watershed date for the fiscal year end, the VaR calculation 316 is performed (1) upon all cashflows P, resulting in the total VaR V, (2) upon only all cashflows in $P_1$ occurring prior to the watershed date, yielding VaR $V_1$, and (3) upon only all cashflows in $P_2$ occurring after the watershed date, yielding VaR $V_2$. In this case, $V_1$ represents "income statement risk," and $V_2$ represents "balance sheet risk." The fact that no cashflows are allocated across the fiscal year watershed date provides the risk manager strong assurances that the division of risks is accurate. Furthermore, an extremely useful collateral calculation is now available to the risk manager, namely, $$\rho = \frac{V^2 - (V_1^2 + V_2^2)}{2V_1V_2}$$

which is the implied correlation coefficient between balance sheet risk and income statement risk. When this is negative, the two risks offset each other, when positive, they reinforce.

The ordinal edge subjected to watershed treatment need not be the tenor edge; it might instead be the credit edge, for example. While the rationale for this is less clear, any ordinal edge (or many of them) may be selected for watershed treatment. Again, however, the regular allocation is performed upon each such disjoint set, provided that the cashflow edge values lie within that set.

Figure 4:
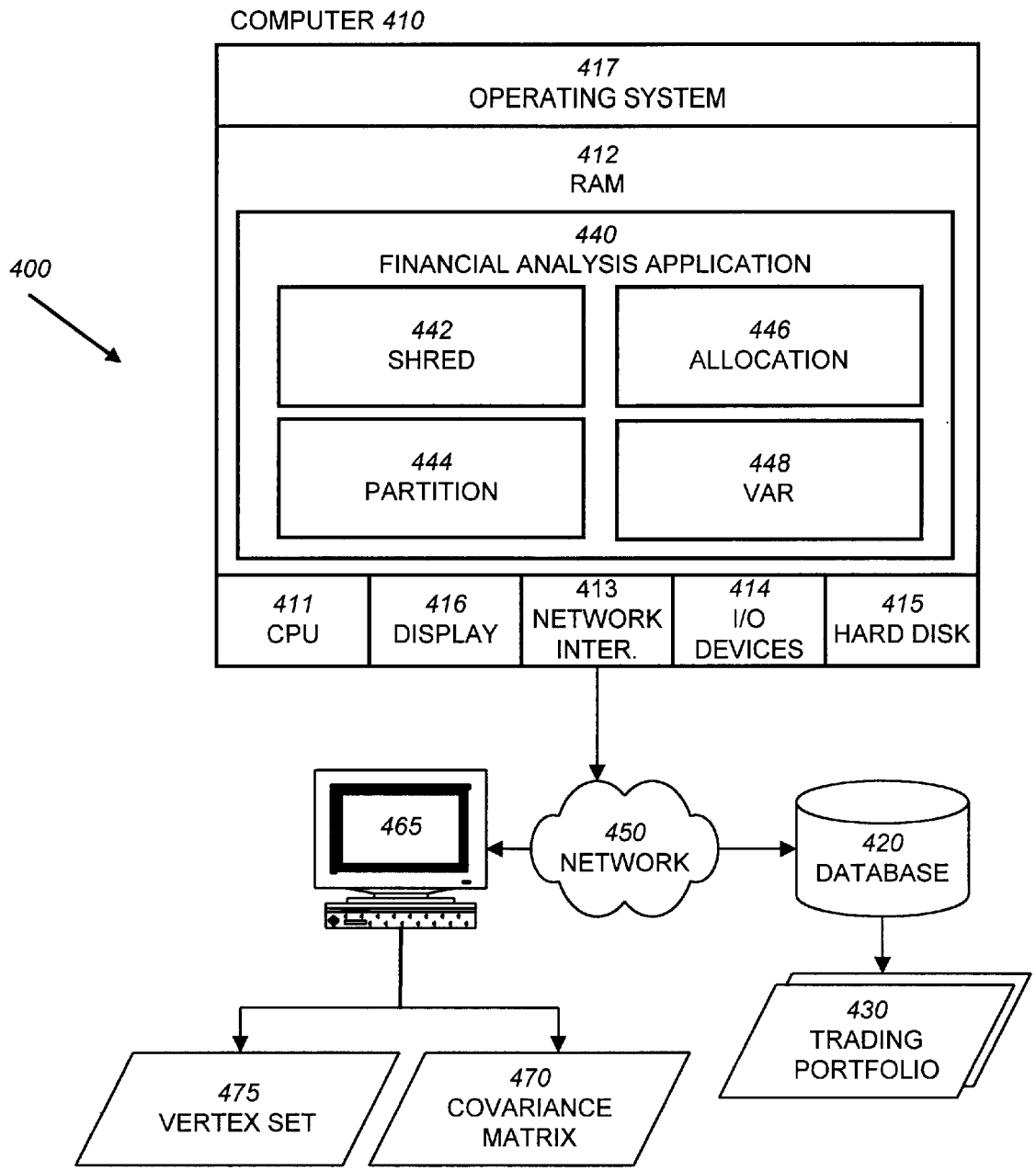
FIG. 4 is an illustration of a system architecture for a computer system to practice the present invention.

Referring now to FIG. 4 there is shown an illustration of one embodiment of a computer system in accordance with the present invention. The system 400 includes a computer 410 coupled to a database 420 via a network 450. The computer 410 is of conventional design, and includes a processor 411, randomly addressable memory (RAM) 412, network interface 413, input and output devices 414, hard disk 415, and a display 416. The computer 410 executes a conventional operating system 417. In a preferred embodiment, the computer is an Intel-compatible personal computer operating Microsoft's Windows™ operating system. Other computers and operating systems may also be used.

The computer 410 interfaces with the database 420 on a mass storage device in a conventional manner, to store and retrieve data therefrom. The database 420 stores at least one trading portfolio 430. A trading portfolio 430 comprises a set of financial instruments or trades, or other trading portfolios 430. For each financial instrument, appropriate data identifying the type, amount, and realization dates, and other attributes of the instrument, along with some means for associating the financial instrument with its trading portfolio 430. In a preferred embodiment, the database 420 is relational. In addition, the database 420 preferably maintains as one of its tables (or other useful data structure) a list of the types of financial instruments used in the portfolios 430, along with a nominal (e.g., $1) amount for the instrument.

In a preferred embodiment, the computer 410 interfaces with a network 450 to communicate with other remote computer systems, and receive from at least one such computer 465 a computer readable dataset comprising a covariance matrix 470 for selected ones of the types of financial instruments stored in the database 420, and a vertex set 475. The covariance matrix 470 and vertex set 475 are then stored in the database 420 or used directly in the RAM 412. The covariance matrix 470 defines the covariance values for the selected financial instruments at predetermined tenors, in the manner described above. The vertex set 475 defines vertices for the tenors in the covariance matrix 470. In one preferred embodiment, the covariance matrix 470 is received and updated to the database 420 on a daily basis. One source of the covariance matrix 470 and vertex set 475 is J. P. Morgan's RiskMetrics™ dataset, available daily on the World Wide Web at: http://www.jpmorgan/RiskMetrics/DOWNLOADING/download-data.html. Alternatively, the covariance matrix 470 and vertex set 475 may be locally generated.

The computer 410 stores and executes a financial analysis application 440. The financial analysis application 440 is a software product that operates in accordance with the present invention, executing software instructions which implement various portions of the method of the present invention. The financial analysis application 440 may be stored in a computer readable medium, such as a CD-ROM and loaded into the memory of the computer in a conventional manner. The financial analysis application 440 reads and manipulates data regarding a trading portfolio 430 from the database 420 in accordance with the present invention to produce a VaR value for various sets of cashflows Pi of the trading portfolio 430 with respect to various user defined watershed variables. In one embodiment, the financial analysis application 440 includes a shred module 442, a partition module 444, an allocation module 446 and a VaR module 448.

The shred module 442 reads the trading portfolio 430 and generates the shredded cashflow set P. The partition module 444 receives the user defined watershed variables, reduces the watershed variables to comparable terms, and partitions the vertex set M, and cashflows P based on the watershed vertices into respective vertex sets $M_i$ and cashflow sets $P_i$. The VaR module 448 receives the partitioned vertex sets $M_i$ and cashflows sets $P_i$, and the covariance data, and computes a VaR value for each partitioned cashflow set $P_i$, using conventional VaR computations.

In summary, the present invention provides a theoretically sound method of determining value at risk for transactions where it is necessary to allocate the transactions with respect to some externally defined variable that is not inherently evaluated in the covariance data and vertex data. The allocation methodology of the present invention enables the determination of income and balance sheet risk without introducing instability or inaccuracies found in other allocation methodologies.

I claim:

1. A computer implemented method of determining a value-at-risk measure for each of a selected set of transactions, the computer implemented method comprising:

converting the transactions into a set of cashflows;

storing a set of vertices, each vertex including an edge value for each of a plurality of edges, each edge having a unit type, wherein selected ones of the vertices form a canonical vertex set;

receiving a set of N watershed variable values for at least one of the plurality of edges;

converting the N watershed variable values to a same unit type as the edge;

partitioning the values of the edge into N+1 partitioned edge value sets according to the N watershed variable values;

partitioning the vertices of the canonical vertex set according to the N+1 partitioned edge value sets to produce N+1 partitioned vertex sets, each partitioned vertex set including at least one vertex;

partitioning the set of cashflows according to the N+1 partitioned edge value sets, to produce N+1 partitioned cashflow sets, each of the N+1 partitioned cashflow sets including at least one cashflow;

for each $j^{th}$ (j=1 . . . N+1) partitioned cashflow set, allocating the cashflows within the $j^{th}$ partitioned cashflow set onto only the vertices in a corresponding $j^{th}$ partitioned vertex set; and for each partitioned vertex set, determining a value at risk for the cashflows allocated unto the vertices in the partitioned vertex set.

2. A computer implemented method of determining a value-at-risk measure for each of a selected set of transactions, the computer implemented method comprising:

converting the stored transactions into a set of cashflows, each cashflow associated with a date, wherein there is an ordered set of dates associated with the cashflows;

partitioning the ordered set of dates into N+1 partitioned date sets according to a set of N dates;

partitioning a set of vertices according to the N+1 partitioned date sets and a date edge of each vertex to produce N+1 partitioned vertex sets, each partitioned vertex set including at least one vertex;

partitioning the set of cashflows according to the date of each cashflow and dates in each of the N+1 partitioned date sets, to produce N+1 partitioned cashflow sets, each of the N+1 partitioned cashflow sets including at least one cashflow;

for each $j^{th}$ (j=1 . . . N+1) partitioned cashflow set, allocating the cashflows within the $j^{th}$ partitioned cashflow set onto only the vertices in a corresponding $j^{th}$ partitioned vertex set; and for each partitioned vertex set, determining the value at risk measure for the cashflows allocated onto the vertices in the partitioned vertex set.

3. A computer implemented method of determining balance sheet value at risk and income statement value at risk for a portfolio of transactions, comprising:

converting the transactions into a plurality of cashflows;

partitioning the cashflows into a first cashflow set and a second cashflow set with respect to a selected date;

partitioning a set of market risk data into a first market risk data set and a second market risk data with respect to the selected date;

mapping the first and second cashflow sets onto the respective first and second market risk data set to produce first and second mapped sets of cashflows;

determining the income statement value at risk measure from the first mapped set of cashflows; and determining the balance sheet value at risk measure from the second mapped set of cashflows.

4. A computer implemented method of determining an analytic variance-covariance value-at-risk measure of balance sheet and income statement risk for a portfolio of transactions, comprising:

converting the transactions into a plurality of cashflows;

partitioning the cashflows into a first set of cashflows occurring on or before a selected date, and a second set of cashflows occurring after the selected date;

partitioning a variance-covariance matrix of market risk factors associated with a set of predetermined constant maturity tenors (CMTs), into a first submatrix of market risk factors having CMTs occurring on or before the selected date, and a second submatrix of market risk factors having CMTs occurring after the selected date;

mapping the first set of cashflows onto the first submatrix of market risk factors;

mapping the second set of cashflows onto the second submatrix of market risk factors;

determining a first value at risk measure of income statement risk from the first mapped set of cashflows; and determining a second value at risk measure of balance sheet risk from the second mapped set of cashflows.

5. A computer implemented method of determining an analytic variance-covariance value-at-risk measure of balance sheet and income statement risk for a portfolio of transactions, comprising:

converting the transactions into a plurality of cashflows;

partitioning the cashflows into a first set of cashflows occurring on or before a selected date, and a second set of cashflows occurring after the selected date;

partitioning a RiskMetrics data set of vertices and a covariance matrix into a first subset having vertices occurring on or before the selected date, and a second subset having vertices occurring after the selected date;

mapping the first set of cashflows onto the first subset of vertices;

mapping the second set of cashflows onto the second subset of vertices;

determining a first VaR measure of income statement risk from the first mapped set of cashflows; and determining a second VaR measure of balance sheet risk from the second mapped set of cashflows.

6. A computer implemented method of determining an analytic variance-covariance value-at-risk measure for a portfolio of transactions, comprising:

converting the transactions into a plurality of cashflows;

partitioning the cashflows into a first set of cashflows occurring on or before a selected date, and a second set of cashflows occurring after the selected date;

providing a set of predetermined constant maturity tenors (CMT), each CMT associated with a price volatility and a covariance with the other CMTs;

partitioning the set of CMTs into a first subset having CMTs maturing on or before the selected date, and a second subset having CMTs maturing after the selected date;

mapping the first set of cashflows onto the first subset of CMTs;

mapping the second set of cashflows onto the second subset of CMTs;

determining a first VaR measure of income statement risk from the first mapped set of cashflows; and determining a second VaR measure of balance sheet risk from the second mapped set of cashflows.

7. A computer implemented method of determining an analytic variance-covariance value-at-risk measure for income statement risk for transactions occurring prior to a selected date, and a value at risk measure for balance sheet risk for transactions occurring after the selected date, the method comprising:

providing a set of predetermined constant maturity tenors (CMT), each CMT associated with a price volatility and a covariance with the other CMTs;

converting the transactions into a plurality of cashflows, each cashflow occurring on a date;

creating a first set of allocated cashflows by:
    determining a last CMT occurring prior to the selected date;
    allocating all cashflows occurring on the selected date, or between the selected date and the last CMT only to the last CMT; and
    regularly allocating all other cashflows occurring prior to the last CMT to the other CMTs prior to the selected date;

creating a second set of allocated cashflows by:
    determining a first CMT occurring after the selected date;
    allocating all cashflows occurring after the selected date and on or before the first CMT only to the first CMT; and
    regularly allocating all other cashflows occurring after the first CMT to the other CMTs after the selected date;

determining a first value at risk measure of income statement risk using the first set of allocated cashflows; and determining a second value at risk measure of balance sheet risk using the second set of allocated cashflows.

8. A computer system for determining an analytic variance-covariance value at risk measure for a selected set of transactions of a portfolio of transactions stored in a database, the system comprising:

a shred module that generates a set of cashflows for each of the selected transactions;

a partition module that receives at least one user defined watershed variable, and converts the watershed variable to a type of value that is comparable to a corresponding type of value of the cashflows, and that partitions a set of risk characteristic vertices and the cashflows using the watershed variables into respective vertex sets and cashflow sets; and a value at risk module coupled to the partition module and the database, that receives the partitioned vertex sets and the partitioned cashflows sets, and covariance data corresponding to the risk characteristic vertices, and computes a value at risk measure for each partitioned cashflow set.

9. A computer system for determining an analytic variance-covariance value at risk measure for a selected set of transactions of a portfolio of transactions stored in database, the system comprising:

means for converting the stored transactions into a set of cashflows, each cashflow associated with a date, wherein there is an ordered set of dates associated with the cashflows;

means for partitioning the ordered set of dates into N+1 partitioned date sets according to a set of N dates;

means for partitioning a set of vertices according to the N+1 partitioned date sets and a date edge of each vertex to produce N+1 partitioned vertex sets, each partitioned vertex set including at least one vertex;

means for partitioning the set of cashflows according to the date of each cashflow and dates in each of the N+1 partitioned date sets, to produce N+1 partitioned cashflow sets, each of the N+1 partitioned cashflow sets including at least one cashflow;

means for allocating the cashflows within each $j^{th}(j=1 \ldots N+1)$ partitioned cashflow set onto only vertices in a corresponding $j^{th}$ partitioned vertex set; and means for determining for each partitioned vertex set, the value at risk measure for the cashflows allocated onto the vertices in the partitioned vertex set.

* * * * *